US012130875B2

(12) United States Patent
Huang et al.

(10) Patent No.: US 12,130,875 B2
(45) Date of Patent: Oct. 29, 2024

(54) DISTRIBUTING DIGITAL COMPONENTS BASED ON PREDICTED ATTRIBUTES (71) Applicant: Google LLC, Mountain View, CA (US)

(72) Inventors: Wei Huang, Kirkland, WA (US); Arne Mauser, Los Altos Hills, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/008,604

(22) PCT Filed: Jun. 2, 2022

(86) PCT No.: PCT/US2022/031898
§ 371 (c)(1),
(2) Date: Dec. 6, 2022

(87) PCT Pub. No.: WO2023/234938
PCT Pub. Date: Dec. 7, 2023

(65) Prior Publication Data
US 2024/0160678 A1    May 16, 2024

(51) Int. Cl.
G06F 16/9535    (2019.01)
G06F 16/906    (2019.01)
(Continued)

(52) U.S. Cl.
CPC ........ *G06F 16/9535* (2019.01); *G06F 16/906* (2019.01); *G06N 20/00* (2019.01);
(Continued)

(58) Field of Classification Search
CPC ... G06F 16/9535; G06F 16/906; G06N 20/00; H04L 67/306; H04L 67/535; H04L 67/55
See application file for complete search history.

(56) References Cited

U.S. PATENT DOCUMENTS 8,073,866 B2 *  12/2011  Eagle ................. G06Q 30/0269
                                                      707/706
11,263,241 B2 *  3/2022  Rezaeian .............. G06F 16/285
(Continued)

FOREIGN PATENT DOCUMENTS

CN        115335825 A  * 11/2022  ............. G06F 21/10
WO    WO 2022071929      4/2022

OTHER PUBLICATIONS

Adexchanger.com [online], "Google Chrome Will Drop Third-Party Cookies In 2 Years" Jan. 2020, retrieved on Feb. 8, 2023, retrieved from URL <https://www.adexchanger.com/online-advertising/google-chrome-will-drop-third- party-cookies-in-2-years/>, 7 pages.
(Continued)

*Primary Examiner* — Alina A Boutah
(74) *Attorney, Agent, or Firm* — Fish & Richardson P.C.

(57) ABSTRACT

Methods, systems, and apparatus, including computer programs encoded on a computer storage medium, for selecting and distributing digital components based on predicted user attributes of users are described. In one aspect, a method includes obtaining data indicating content categories of content of the content pages accessed by the user during the user visits. A determination is made for an aggregate measure of each content category based on a quantity of user visits to content pages of the electronic resource of the publisher that included content classified as belonging to the content category. User attribute prediction data indicating previously predicted user attributes of the user is obtained. User attributes are predicted for the current visit of the user to the electronic resource of the publisher that is further used to select digital components for display with the electronic resource on a client device during the current visit.

20 Claims, 4 Drawing Sheets (51) Int. Cl.
 G06N 20/00 (2019.01)
 H04L 67/306 (2022.01)
 H04L 67/50 (2022.01)
 H04L 67/55 (2022.01)
(52) U.S. Cl.
 CPC .......... H04L 67/306 (2013.01); H04L 67/535 (2022.05); H04L 67/55 (2022.05)

(56) References Cited

U.S. PATENT DOCUMENTS

| | | | | |
|---|---|---|---|---|
| 2002/0173971 A1* | 11/2002 | Stirpe | ................ | G06Q 30/0255 707/E17.109 |
| 2011/0082824 A1* | 4/2011 | Allison | ................ | G06Q 10/10 706/46 |
| 2011/0191344 A1* | 8/2011 | Jin | ................ | G06F 16/951 707/769 |
| 2013/0137463 A1* | 5/2013 | Busch | ................ | H04L 67/535 455/456.3 |
| 2014/0032708 A1* | 1/2014 | Zamir | ................ | G06F 16/9537 709/217 |
| 2014/0068011 A1 | 3/2014 | Zhang et al. | | |
| 2014/0337513 A1* | 11/2014 | Amalapurapu | .... | G06Q 30/0269 709/224 |
| 2016/0092699 A1* | 3/2016 | Riva | ................ | H04L 63/0421 726/26 |
| 2016/0188725 A1* | 6/2016 | Wang | ................ | G06F 16/9535 707/734 |
| 2017/0011422 A1* | 1/2017 | Yang | ................ | H04B 5/72 |
| 2019/0149626 A1* | 5/2019 | Shah | ................ | H04L 67/53 706/12 |
| 2020/0034858 A1* | 1/2020 | Chandra Sekar Rao | ................ | G06N 3/044 |
| 2023/0044316 A1* | 2/2023 | Khan | ................ | G06F 16/9535 |
| 2023/0103131 A1* | 3/2023 | Atkin | ................ | G06T 11/206 715/704 |
| 2023/0205915 A1* | 6/2023 | Wang | ................ | G06N 20/00 726/26 |
| 2023/0274183 A1* | 8/2023 | Mauser | ................ | G06F 21/6245 706/12 |

OTHER PUBLICATIONS

Blog.google [online], "Building a privacy-first future for web advertising" Jan. 25, 2021, retrieved on Feb. 8, 2023, retrieved from URL <https://blog.google/products/ads-commerce/2021-01-privacy-sandbox/>, 5 pages.

Digitalcontentnext.org [online], "The year of publisher-driven identity" Mar. 2021, retrieved on Feb. 8, 2023, retrieved from URL <https://digitalcontentnext.org/blog/2021/03/01/the-year-of-publisher-driven- identity/>, 4 pages.

International Search Report and Written Opinion in International Appln. No. PCT/US2022/031898, mailed on Jan. 20, 2023, 13 pages.

Thedrum.com [online], "The future of identity for publishers, in their own words" Apr. 2021, retrieved on Feb. 8, 2023, retrieved from URL <https://www.thedrum.com/industryinsights/2021/04/06/the-future-identity-publishers-their- own-words>, 11 pages.

* cited by examiner

DISTRIBUTING DIGITAL COMPONENTS BASED ON PREDICTED ATTRIBUTES

CROSS-REFERENCE TO RELATED APPLICATIONS

This application is a National Phase of International Application No. PCT/US2022/031898, filed Jun. 2, 2022, the entirety of which is hereby incorporated by reference.

TECHNICAL FIELD

This specification relates to data processing and machine learning classification.

BACKGROUND

A client device can use an application (e.g., a web browser, a native application) to access a content platform (e.g., a search platform, a social media platform, or another platform that hosts content). The content platform can display, within an application launched on the client device, digital components (a discrete unit of digital content or digital information such as, e.g., a video clip, an audio clip, a multimedia clip, an image, text, or another unit of content) that may be provided by one or more content source/platform

SUMMARY

In general, one innovative aspect of the subject matter described in this specification can be embodied in methods that include the actions of obtaining, for each of multiple user visits by a user to content pages of an electronic resource of a publisher, data indicating content categories of content of the content pages accessed by the user during the user visits; determining, for each content category, an aggregate measure based on a quantity of user visits by the user to content pages of the electronic resource of the publisher that included content classified as belonging to the content category; obtaining, for each of the plurality of user visits by the user to the content pages of the electronic resource of the publisher, user attribute prediction data indicating previously predicted user attributes of the user that were predicted based on activity of the user at the electronic resource of the publisher during the user visit; predicting, for a current visit of the user to the electronic resource of the publisher, user attributes of the user based on the aggregate measure for each content category and the obtained user attribute prediction data; and causing a digital component selected based on the predicted user attributes to be displayed with the electronic resource on a client device of the user during the current visit. Other embodiments of this aspect include corresponding systems, apparatus, and computer programs, configured to perform the actions of the methods, encoded on computer storage devices.

These and other embodiments can each optionally include one or more of the following features. In some aspects, obtaining data indicating content categories of the content of the content pages includes evaluating digital content of the electronic resource displayed on the client device of the user and assigning the content to the content categories based on the evaluation.

Some aspects include determining the aggregate measure for each content category by determining a weighted sum of the visits by the user to content pages of the electronic resource of the publisher that included content classified as belonging to the content category.

Some aspects include determining the weighted sum of the user visits for a given content category by weighting each user visit based on a duration of time between a time at which the user visit occurred and a current time.

Some aspects include determining the aggregate measure for each content category by assigning, for each user visit by the user to a content page of the electronic resource of the publisher, a visit value based on whether the content page included content classified as belonging to the content category and determining an average of the visit values for the content category.

Some aspects include receiving a digital component request comprising the predicted user attributes and one or more contextual signals that indicate a context of one or more content pages of the electronic resources visited during the current user visit, selecting the digital component based on the predicted attributes and the one or more contextual signals and sending the digital component to the client device of the user.

Some aspects include predicting, the user attributes of the user for the current visit to the electronic resource of the publisher based on the aggregate measure for each content category and the obtained user attribute prediction data by providing, as input to a context-based attribute prediction model trained to predict user attributes based on contextual signals, the aggregate measure for each content category, the user attribute prediction data for each user visit by the user to the content pages of the electronic resource of the publisher, and the one or more contextual signals and receiving, as an output of the context-based attribute prediction model, the predicted user attributes of the user.

Particular embodiments of the subject matter described in this specification can be implemented so as to realize one or more of the following advantages. User attributes of the user is important for providing users with personalized online experiences, e.g., by providing specific digital components in which the users are interested. In general, data used to provide a personalized online experience has been aggregated through the use of third-party cookies (e.g., cookies that belong to a domain that differs from the domain the client device is visiting), which allows the linking of browsing activity and other behavioral and/or identifying users' online activity across time, domains, sessions, and devices. However, an increasing proportion of web traffic does not allow for the use of third-party cookies, either due to users' privacy preferences, lack of browser support for third-party cookies, or other degradation thereby eliminating the possibility of using third-party cookies to aggregate data from multiple different sources.

To solve the problem of aggregating data from multiple different sources without using (or the availability of) third-party cookies, the techniques described in this document enable the prediction of user attributes without the use of third-party cookies. As such, the use of predicted user attributes can provide improvements related to data access, user privacy, and data security, as well as providing a solution to a data aggregation problem caused by the deprecation and/or blocking of third-party cookies by browsers.

In addition, the amount of data transmitted over networks can be reduced using the described techniques as third-party cookies are not sent from client devices to the various content providers. Aggregated over millions of client devices, the reduction in consumed bandwidth is substantial. Providing digital components that users are likely to view also reduces wasted bandwidth consumption by not transmitting digital components that users are unlikely to view or interact with at their client devices. This also reduces the likelihood of a user rejecting a digital component in favor of a different digital component. As well as avoiding the requirement of additional bandwidth for the delivery of the different digital component, the rendering resources and associated overheads e.g. battery power drain, processor cycles and memory utilization at the client device would not be wasted on a rejected digital component.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document discloses methods, systems, apparatus, and computer readable media for predicting user attributes that otherwise would have been collected using third-party cookies. The predicted user attributes can be used to select and distribute digital components while maintaining user privacy and data security.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 1:
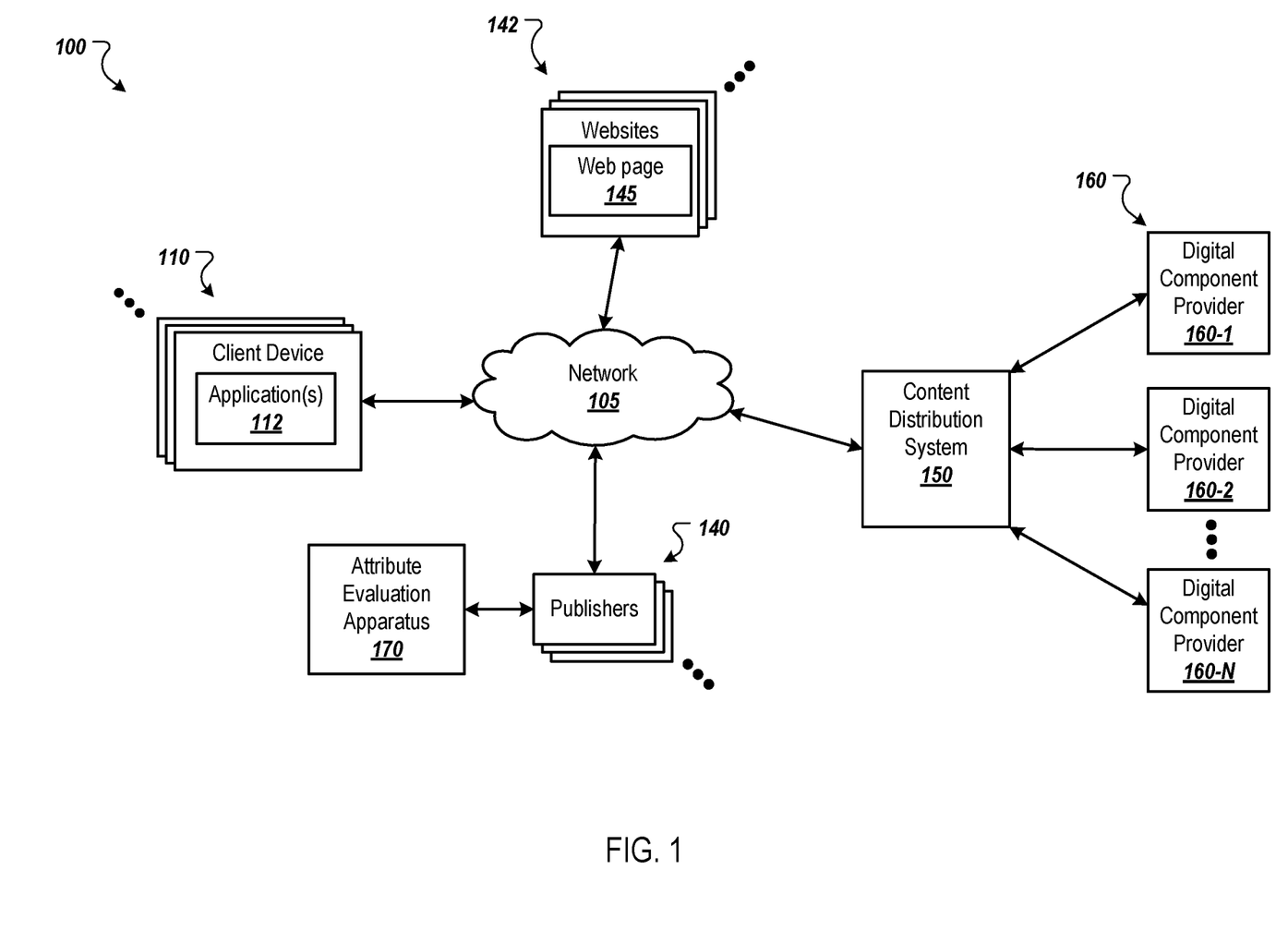
FIG. 1 is a block diagram of an example environment in which digital components are distributed.

FIG. 1 is a block diagram of an example environment 100 in which digital components are distributed. The example environment 100 includes a data communication network 105, such as a local area network (LAN), a wide area network (WAN), the Internet, a mobile network, or a combination thereof. The network 105 connects client devices 110, publishers 140, websites 142, and a content distribution system 150. The example environment 100 can include many different client devices 110, publishers 140, websites 142, content distribution systems 150, and digital component providers 160-1 to 160-N.

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hot word" or "hot phrase" that activates the microphone to accept audio input. The digital assistant device can also include a camera and/or display to capture images and visually display information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, or a gaming device or console.

A client device 110 typically includes applications 112, such as web browsers and/or native applications, to facilitate the sending and receiving of data over the network 105. A native application is an application developed for a particular platform or a particular device (e.g., mobile devices having a particular operating system). Publishers 140 can develop and provide, e.g., make available for download, native applications to the client devices 110. A web browser can request a web page 145 from a web server that hosts a website 142 of a publisher 140, e.g., in response to the user of the client device 110 entering the resource address for the web page 145 in an address bar of the web browser or selecting a link that references the resource address. Similarly, a native application can request application content from a remote server of a publisher.

Some resources, application pages, or other application content can include digital component slots for providing digital components with the web pages 145 or application pages. Web pages of web-sites and application pages of native applications are examples of content pages that show depict various content to users. Each type of content page can also include one or more digital component slots for displaying digital components with the other content. A content page can be a set of content that is displayed concurrently within a user interface.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource provided by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a content page of an electronic resource (e.g., a website or native application) that includes one or more digital component slots, the application 112 can request a digital component for each slot. In some implementations, the digital component slot can include code (e.g., scripts) that cause the application 112 to request a digital component from one or more servers of the content distribution system 150 for display to a user of the client device 110. For example, the code of a digital component slot can enable the client device 110 to generate a packetized data request including a header and payload data. The application 112 can send the packetized data request to the content distribution system 150 to request digital components from the content distribution system 150. The application 112 can generate and send a digital component request, e.g., in the form of a packetized data request, to the content distribution system 150 over the network 105.

In some implementations, the content distribution system 150 can be implemented as a content platform, e.g., a supply-side platform (SSP) or a demand-side platform (DSP). In general, content platforms manage the selection and distribution of digital components on behalf of publishers 140 and digital component providers 160-1 to 160-N. Some publishers 140 use an SSP to manage the process of obtaining digital components for digital component slots of its resources and/or applications. An SSP is a technology platform implemented in hardware and/or software that automates the process of obtaining digital components for the resources and/or applications. Each publisher 140 can have a corresponding SSP or multiple SSPs. Some publishers 140 may use the same SSP.

Digital component providers 160 can create (or otherwise publish) digital components that are provided in digital component slots of publisher's resources and applications. The digital component providers 160 can use a DSP to manage the provisioning of its digital components for delivery in digital component slots. A DSP is a technology platform implemented in hardware and/or software that automates the process of distributing digital components for delivery with the resources and/or applications. A DSP can interact with multiple supply-side platforms SSPs on behalf of digital component providers 160 to provide digital components for delivery with the resources and/or applications of multiple different publishers 140. In general, a DSP can receive requests for digital components (e.g., from an SSP), generate (or select) a selection parameter for one or more digital components created by one or more digital component providers based on the request, and provide data related to the digital components (e.g., the digital components itself) and the selection parameters to an SSP. The SSP can then select one or more digital components and transmit data related to the digital components and the selection parameters to the client device 110.

The digital component request can include data specifying features such as a name (or network location) of a server from which media is being requested. The digital component request can include contextual data related to a display environment in which the requested digital component will be displayed. The contextual data can include, for example, the content page being requested and characteristics of locations of the content page at which digital component can be displayed. For example, the contextual data can include a reference (e.g., Uniform Resource Locator (URL) or Universal Resource Identifier (URI)) to a content page in which the digital component will be provided, available locations of the application page that are available to deliver digital components, sizes of the available locations, and/or media types that are eligible for delivery in the locations. Similarly, the contextual data can include keywords associated with the content page ("document keywords") or entities (e.g., people, places, or things) that are referenced by the content page to facilitate identification of digital components that are eligible for delivery with the content page. The contextual data can also include a search query that was submitted from the client device 110 to obtain search results and/or data specifying search results and/or textual, audible, or other visual content that is included in the search results.

Digital component requests can also include additional contextual data, such as data that a user of the client device has provided, geographic information indicating a state or region from which the component request was submitted, and/or other appropriate data that provides context for the environment in which the digital component will be displayed (e.g., a time of day of the component request, a day of the week of the component request, a type of device at which the digital component will be displayed, such as a mobile device or tablet device).

In some situations, digital component requests can also include user attributes such as demographic information, user interests, and/or other information that can be used to personalize the user's online experience. In some situations, these characteristics and/or information regarding the user of the client device 110 is readily available. For example, publishers 140 and digital component providers 160 can allow the user to register with the content platform by providing such user information. In another example, the content platform can use cookies to identify client devices, which can store information about the user's online activity and/or user characteristics. Historically, third-party cookies have been used to provide user characteristics to the content platforms irrespective of what domain the user was visiting. However, these and other methods of identifying user characteristics are becoming less prevalent in an effort to protect user privacy. For example, browsers have been redesigned to actively block the use of third-party cookies, thereby preventing the content platforms from accessing user characteristics.

The publishers 140 can interact with an attribute evaluation apparatus to predict one or more user attributes (which can also be referred to as predicted user attributes) based on the user activity of the user with an electronic resource, e.g., website, native application, or platform (e.g., video sharing platform) of the publisher 140. For example, if the user of the client device 110 uses a browser based application 112 to access a web page 145 from a web server that hosts a website 142 of a publisher 140, the web server hosting the website 142 can request that the attribute evaluation apparatus 170 analyze the content accessed by the user to generate one or more predicted user attributes of the user.

In some implementations, the attribute evaluation apparatus 170 implements one or more machine learning models that predict user attributes of a user based on user activity of the user with the electronic resource of the publisher 140 and the content of the electronic resource accessed by the user. The machine learning model can be any machine learning technique deemed suitable for the specific implementation, such as an artificial neural network (ANN), support vector machines (SVM), random forests (RF) etc., which includes multiple trainable parameters. During the training process, the multiple training parameters are adjusted while iterating over the multiple samples of a training dataset based on the error generated by a loss function that is specific to the machine learning model. The loss function compares the predicted values of the machine learning model against the true value of the samples in the training set to generate a measure of prediction error.

The machine learning model can be trained to receive, as input, data describing content accessed by the user at the electronic resource and output data identifying predicted user attributes of the user. For example, the data describing the content accessed by the user can include content categories for content of content pages of the electronic resource that the user requested or otherwise viewed. As described below, content pages can be assigned content categories, which can relate to verticals in some implementations, based on the content displayed by the content pages.

In some implementations, the attribute evaluation apparatus 170 implements a rule based model that determines one or more predicted user attributes based on rules specified by the publisher 140. For example, a publisher such as a shoe manufacturer can specify that a user purchasing a shoe of a particular size has a user attribute of having a shoe size that is equal to the particular size. As per this example, if a user uses the application 112 to browse through a shoe and purchases the shoe of size "US 11.5" to the cart, the attribute evaluation apparatus 170 can determine that the user has a user attribute of shoe size US 11.5.

In some implementations, the publisher 140 (or another entity) can categorize the content pages of the publisher's electronic resource into content categories based on the content of the content pages. For example, a publisher 140 of a video sharing platform can categorize videos shown on the platform into categories such as outdoors, baseball, gardening, car repair, etc. Similarly, a publisher 140 such as digital news agency can categorize news pages into categories such as sports, politics, finance etc. The publisher 140 can further categorize one or more of the categories into sub categories. For example, the digital news agency can further sub-categorize politics into national and international politics.

In some implementations, the publisher 140 can use a trained machine learning model to classify content pages into one or more content categories based on the content shown on the content pages. For example, the machine learning model can implement object recognition, natural language recognition, text analysis, and/or other appropriate techniques to classify the content pages into content categories.

In some implementations, the attribute evaluation apparatus 170 can process one or more content categories of the content accessed by the user of the client device 110 to predict the one or more user attributes.

In some implementations, the publisher 140, e.g., a web server or other server of the publisher 140, can maintain a record of the quantity, e.g., a count, of user accesses to the electronic resource of the publisher 140 and the content pages accessed by the user during each visit so as to generate an aggregated view of the predicted user attributes. For example, the publisher 140 can maintain, for each user, a log that includes, for each user visit to the electronic resource, the content page(s) accessed during the user visit. A user visit can be referred to as a user session that includes a start event (e.g., user requesting a first content page of the electronic resource) and an end event (e.g., the user navigating to a different electronic resource of a different publisher or closing the application).

The publisher 140 can predict user attributes for the user for each visit to the electronic resource of the publisher 140. For example, if the user visits a website 142 of the publisher N times, the attribute evaluation apparatus 170 can predict one or more user attributes for each of the visits (referred to as user attribute prediction data). For example, if the user visits a web page with content related to a plant that is native to a particular geographic region during three different visits to the website 142, the attribute evaluation apparatus 170 can predict that the user is located in this particular region for each of the three visits.

In some implementations, the evaluation apparatus of the publisher 140 can predict user attributes for a user based on user activity during both the current and prior user visits to the electronic resource of the publisher 140. For example, if during a current session, the user of the client device 110 visits the website 142 of the publisher 140, the attribute evaluation apparatus 170 can predict one or more user attributes based on the content accessed by the user of the client device 110 during the current session but also the content accessed by the user during one or more prior sessions. In other implementations, the attribute evaluation apparatus 170 can also predict one or more user attributes based on the content accessed by the user of the client device 110 and one or more predicted user attributes of the prior sessions.

The attribute evaluation apparatus 170 can be configured to predict the user attributes of the user based on the content categories of the content pages accessed by the user during the past visits and/or the current visit. For each user visit, the publisher 140 can assign a visit value to each of a set of content categories based on whether the content of the content page(s) accessed by the user has been assigned to the content category. For example, of the user visits a content page assigned content category A, but does not visit a content page assigned content category B, the publisher 140 can assign, for this user visit, a value of one to content category A and a value of zero to content category B. Other values can also be used. For example, the visit value for a content category assigned to multiple content pages accessed by the user can be based on the quantity of the content pages accessed by the user during the current user visit. In this example, if the user visited two content pages assigned content category A during the user visit, the visit value can be two or 1.5 of subsequent pages are weighted less than the first content page accessed and assigned the content category.

The attribute evaluation apparatus 170 can determine, for each content category, an aggregate measure based on the quantity of visits by the user to content pages of the electronic resource of the publisher that has been classified as belonging to the content category. For example, the attribute evaluation apparatus 170 can use the visit values to determine the aggregate measure. In some implementations, the evaluation apparatus 170 determines the aggregate measure for a content category by determining a sum of the visit values for the content category, e.g., over a given time period or for all user visits of the user to the electronic resource of the publisher. For example, if content category A was assigned a visit value of one for a first visit, a visit value of zero for a second visit, and a visit value of one for a third visit, the aggregate measure for category A would be two.

The attribute evaluation apparatus 170 can determine the aggregate measure for each content category by determining the average of the visit value, a weighted average of the visit value, and/or a weighted sum of the visit value. For example, the attribute evaluation apparatus 170 can weight each visit value based on a duration of time between the user visit corresponding to the visit value and a current time at which the aggregate measure is being determined. The attribute evaluation apparatus 170 can weight a visit value by multiplying the visit value by a weight. Continuing the previous example, the weight for the first visit can be 0.5 based on a duration of one week and the weight for the third visit can be one based on a duration of zero days (e.g., the current visit). Thus, the weight can decay over time to reflect the importance of more recent visits. In this example, the aggregate measure for category A would be based on 0.5 (e.g., 0.5*1 for the first visit), 0 (e.g., 0 for the second visit) and 1 (e.g., 1*1) for the third visit. If a weighted sum is used, the aggregate measure for category A would be 1.5 (e.g. 0.5+0+1).

The attribute evaluation apparatus 170 can predict the user attributes of the user based on the aggregate measure for each content category. For example, the machine learning model of the attribute evaluation apparatus 170 can be trained to receive, as input, the aggregate measure for each content category, and output predicted user attributes for the user based on the aggregate measure for each content category. In another example, the machine learning model can be trained to receive, as input, the aggregate measure for each content category and the predicted user attributes for the user for each user visit to the electronic resource, and output predicted user attributes for the user based on this input.

In implementations in which predicted user attributes are used, the predicted user attributes can be ranked or weighted similar to the content categories. For example, the publisher 140 can rank the predicted user attributes of the prior visits based on the recency of the prior visits, e.g., the duration of time between the prior visit and the current time. For example, the predicted user attributes of the most recent visit of the user of the client device 110 can be ranked higher than the predicted user attributes of older visits. In some implementations, the publisher 140 can assign weights to the predicted attributes based on the recency of the visits. For example, higher weights can be assigned to the predicted user attributes for visits that are more recent than the other visits.

The content distribution system 150 can use the predicted user attributes for a user of a client device 110 to select one or more digital components to provider to the client device 110 for display to the user. In some implementations, when the user of the client device 110 uses the application 112 to load a resource such as a website 142 that includes one or more digital component slots, the web server can include (or embed) the predicted user attributes along with the code (e.g., scripts) that cause the application 112 to request a digital component from the content distribution system 150 for provision to a user of the client device 110. When the application 112 generates a request for digital components, the application 112 can include the predicted user attributes for the user in the digital component request. In response to receiving the digital component request, the content distribution system 150 selects digital components based on the predicted user attributes and the contextual data and returns data related to the selected digital components, e.g., the digital components themselves or a reference (e.g., URL) to a network location from which the digital components can be downloaded.

In some implementations, in response to receiving the digital component request from the application 112, the content distribution system 170 can determine predicted user attributes for the user based on the data in the digital component request. For example, the content distribution system 150 can implement a machine learning model (which can be referred to as a contextual model) that is different from the machine learning model(s) implemented by the attribute evaluation apparatus of the publisher 140. The content distribution system 150 can provide information provided in the digital component request as input to the contextual model. The contextual model, after processing the input, generates an output including a prediction of user attributes for the user.

In general, the contextual model can be trained to predict user attributes of a user based on the contextual data of digital component requests. For example, the contextual model can be trained to output predicted user attributes based on the content of the content page for which digital components are being requested, the location of the client device, etc.

This contextual model can be further trained or adapted to output predicted user attributes based on the aggregate measure for each content category in a set of content categories and/or the predicted user attributes for each of one or more user visits of the user. For example, the contextual model can be trained to output predicted user attributes based on the contextual data, the aggregate measure for each content category, and the predicted user attributes for each user visit.

In another example, the content distribution system 150 can be configured to apply a set of rules to the data of the digital component request and the output of the contextual model. For example, the contextual model can be trained to output predicted user attributes based on the contextual data of the digital component request. The set of rules can specify how to combine the predicted user attributes output by the contextual model with the aggregate measure and/or predicted user attributes included in the digital component request. For example, if the predicted value of a particular user attribute matches between the output of the contextual model and the digital component request, the value of the user attribute can be confirmed and used to select a digital component. If there is a mismatch between the values of the attribute, the value may not be used to select a digital component. In another example, a confidence score for a value of a user attribute can be increased based on the number of user visits for which the user was predicted to have a matching attribute. For example, if all ten user visits to the electronic resource of the publisher resulted in the user being predicted to have user attribute A and the contextual model outputs a prediction that the user has user attribute A, the score for user attribute A can be increased based on the ten matches.

After selecting a digital component, the content distribution system 1750 can send the data for the selected digital component(s) to the client device 110. The application 112 can then display the selected digital component(s) to the user with the content page of the electronic resource being viewed by the user.

Figure 2:
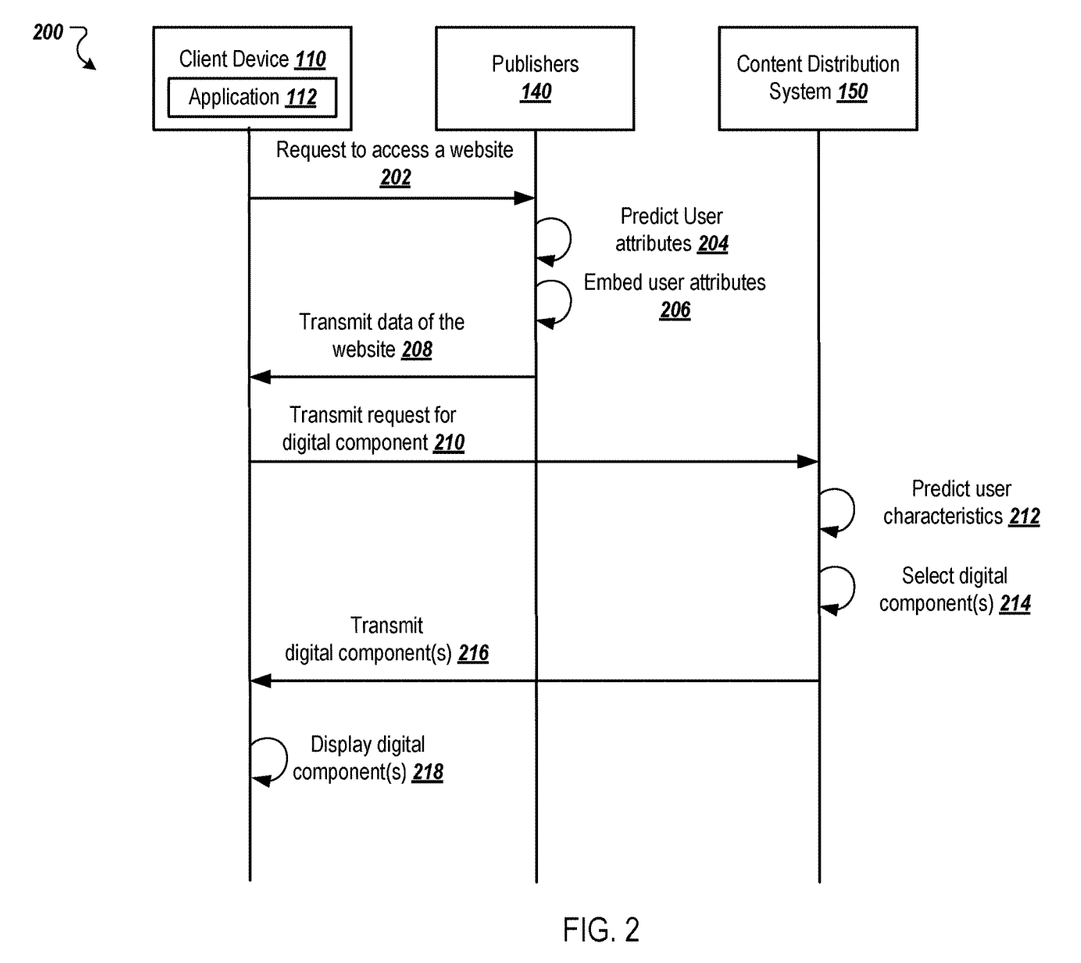
FIG. 2 is a swim lane diagram of an example process for distributing digital components in the environment of FIG. 1.

FIG. 2 is a swim lane diagram of an example process 200 for distributing digital components in the environment 100 of FIG. 1. Operations of the process 200 can be implemented, for example, by a client device 110, a content distribution system 150, and a publisher 140 (e.g., by one or more servers of the publisher 140). Operations of the process 200 can also be implemented as instructions stored on one or more computer readable media which may be non-transitory, and execution of the instructions by one or more data processing apparatus can cause the one or more data processing apparatus to perform the operations of the process 200. The example process 200 is described in terms of website resources, but can also be performed for other types of electronic resources, e.g., application pages of native applications.

The application 112 initiates accessing of a website 142 (202). For example, the user of the client device 110 uses a web browser application 112 to request a web page 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

The web server that hosts the website 142 predicts one or more user attributes (204). For example, web server that hosts a website 142 of a publisher 140 can use an attribute evaluation apparatus 170 to predict one or more predicted user attributes based on the user activity when the user accesses the website 142 of the publisher.

The web server that hosts the website 142, embeds the one or more predicted user attributes to the website 142 (206). For example, the web server can embed the predicted user attributes along with the code (e.g., scripts) in the digital component slots that cause the application 112 to request a digital component from the content distribution system 150 for delivery to a user of the client device 110. In some implementations, instead of just including the predicted one or more user attributes of the current session of accessing the resource such as a website 142, the publisher 140 can also include one or more user predicted user attributes and/or user attribute prediction data of prior sessions. In another implementation, the publisher 140 can also include the aggregate count of user visits to content pages belonging to one or more content categories. For example, the publisher 140 can also include a distribution of user visits to content pages of different content categories.

The web server transmits the data of the website 142 to the client device 110 (208). For example, the web server transmits data of the website 142 that causes the application 112 of the client device 110 to display the website 142 to the user.

The application 112 transmits a request for digital components (210). For example, when the application 112 loads the website 142 that includes one or more digital component slots, the application 112 can request a digital component for each slot from the content distribution system 150. In some implementations, the digital component request can include the one or more predicted user attributes of the current session. In some implementations, the request can also include predicted user attributes of the prior sessions.

The content distribution system 150 can generate one or more user attributes of the user (212). For example, the content distribution system 150 can further analyze the one or more predicted user attributes along with the contextual data of the digital component request to predict one or more user attributes of the user. For example, the content distribution system 150 can implement a contextual model that receives as input information provided in the digital component request. The contextual model, after processing the input, generates an output including a prediction of one or more user attributes.

The content distribution system 150 selects digital components (214). For example, the content distribution system 150 can select the digital components based on the contextual data of the digital component request, the predicted user attributes, and distribution criteria for the digital components. For example, the distribution criteria for a digital component can indicate that the digital component is eligible for display to users having particular user attributes (e.g., user attribute A) and in particular contexts that include particular contextual features (e.g., in particular web pages based on URLs). The distribution criteria can also include selection values that indicate an amount that a digital component provider 160 is willing to provide to a publisher to display the digital component. The content distribution system 150 can use the distribution criteria along with the predicted user attributes and the contextual data to identify eligible digital components and select the eligible digital component having an acceptable selection value, e.g., the eligible digital component having the highest selection value. Providing eligible digital components based on at least one of the distribution criteria, the predicted user attributes or the contextual data reduces wasted bandwidth consumption by not transmitting digital components that users are unlikely to view or interact with at their client devices. This also reduces the likelihood of a user rejecting a digital component in favor of a different digital component. As well as avoiding the requirement of additional bandwidth for the delivery of the different digital component, the rendering resources and associated overheads e.g. battery power drain, processor cycles and memory utilization at the client device would not be wasted on a rejected digital component.

The content distribution system 170 can send the selected digital component(s) to the client device 110 (216). For example, the content distribution system 150 transmits the data for the selected digital component(s) to the client device 110. The application displays the digital component in the digital component slot (218).

Figure 3:
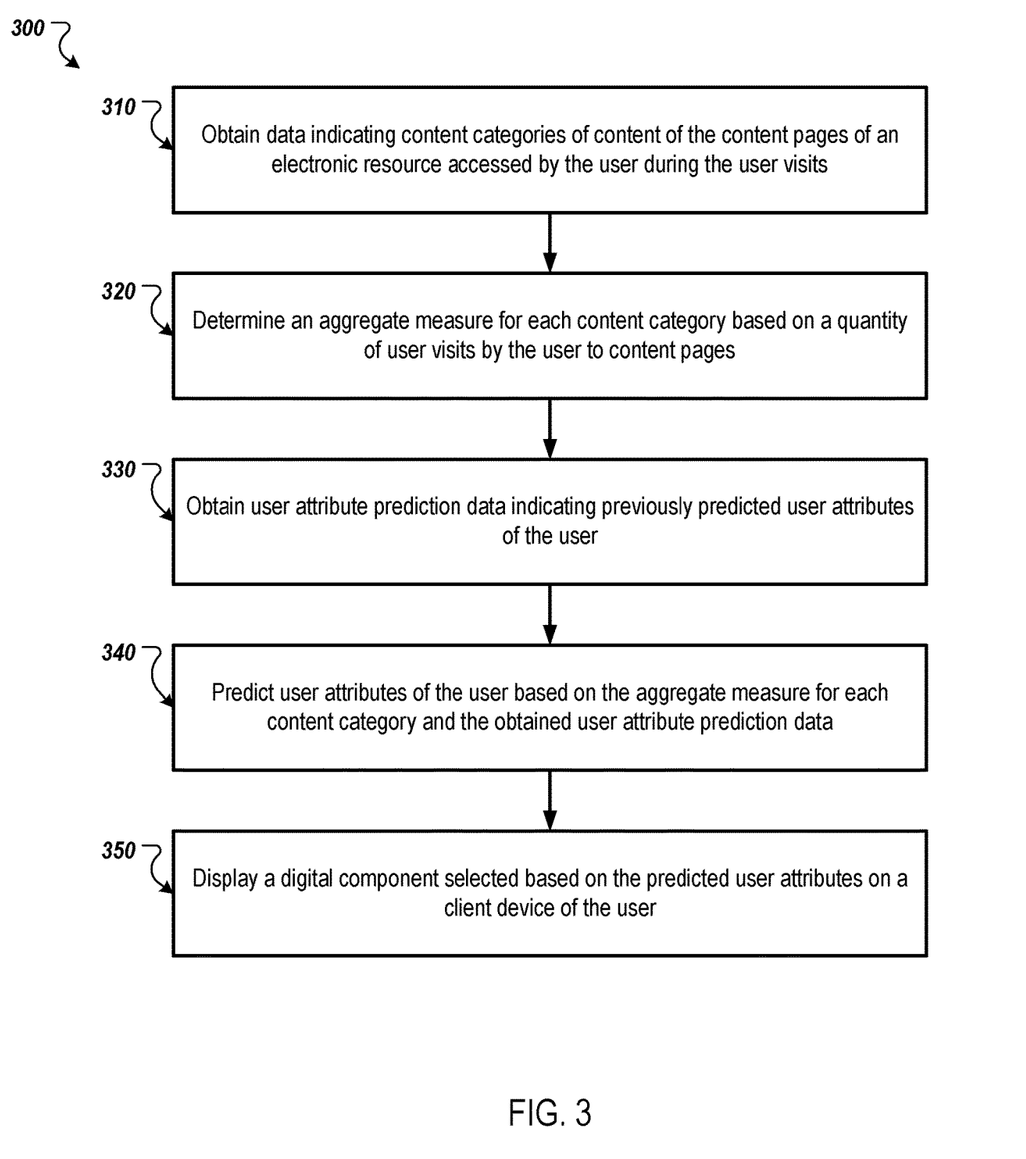
FIG. 3 is a flow diagram that illustrates an example process for selecting and distributing digital components to a client device.

FIG. 3 is a flow diagram that illustrates an example process 300 for selecting and distributing digital components to a client device. Operations of the process 300 can be implemented, for example, by a content distribution system 150 and/or a publisher 140 (e.g., one or more servers of the publisher 140). Operations of the process 300 can also be implemented as instructions stored on one or more computer readable media which may be non-transitory, and execution of the instructions by one or more data processing apparatus can cause the one or more data processing apparatus to perform the operations of the process 300. For brevity, the process 300 is described in terms of a system, which can include one or more computers.

The system obtains data indicating content categories of content of the content pages of an electronic resource accessed by the user during the user visits (310). For example, the system can keep track of a user accessing the electronic resource of the publisher 140. The web server can also keep track of the number of times the user accesses the electronic resource and different content pages along with the time stamps.

The system determines an aggregate measure for each content category based on a quantity of user visits by the user to content pages (320). The publisher 140 (or another entity) can categorize the content of the website into content categories, e.g., that are contextually similar. For example, a publisher 140 such as an online ecommerce platform can categorize items listed on the platform into categories such as shoes, clothes etc. The system can also keep track of the number of user visits to different content pages that are classified as belonging to a particular category. For example, if there are 10 content pages that are classified as belonging to a particular category, the system can aggregate the number of user visits to each of the 10 content pages to calculate the number of user visits to content pages that are classified as belonging to the particular category.

The system obtains user attribute prediction data indicating previously predicted user attributes of the user (330). For example, the system can predict user attributes for a user based on the user activity of the user with the website of the publisher 140. For example, when the user of the client device 110 visits the electronic resource of the publisher 140, the attribute evaluation apparatus 170 can predict one or more user attributes based on the content accessed by the user of the client device 110 during the session. The attribute evaluation apparatus 170 can therefore generate one or more predicted user attributes of the user for each of the prior sessions. The one or more predicted user attributes for the prior sessions can be referred to as user attribute prediction data.

The system predicts user attributes of the user based on the aggregate measure for each content category and the user attribute prediction data (340). For example, the system can predict user attributes for a user based on both the current and prior sessions of user activity with the electronic resource of the publisher 140. For example, if during a current session, the user of the client device 110 visits the electronic resource of the publisher 140, the attribute evaluation apparatus 170 can predict one or more user attributes based on the content accessed by the user of the client device 110 during the current session but also the content accessed by the user during one or more prior sessions. In some implementations, the attribute evaluation apparatus 170 can predict one or more user attributes based on user attribute prediction data of prior user visits to the electronic resource.

The system causes a digital component selected based on the predicted user attributes to be displayed on a client device of the user (350). For example, when the application 112 generates a request for digital components, the application 112 can include the one or more predicted user attributes in the request for digital components. In response to receiving the digital component request, the content distribution system 150 returns data related to a set of digital components along with a selection value for each digital component in the set of digital components to the client device 110. The application 112 can then display the selected digital component with the electronic resource. In another example, the system itself can select the digital component based on the predicted user attributes that it generated and provide the digital component to the client device. The application 112 can then display the digital component with the electronic resource. Providing digital components based on the predicted user attributes reduces wasted bandwidth consumption by not transmitting digital components that users are unlikely to view or interact with at their client devices. This also reduces the likelihood of a user rejecting a digital component in favor of a different digital component. As well as avoiding the requirement of additional bandwidth for the delivery of the different digital component, the rendering resources and associated overheads e.g. battery power drain, processor cycles and memory utilization at the client device would not be wasted on a rejected digital component.

Figure 4:
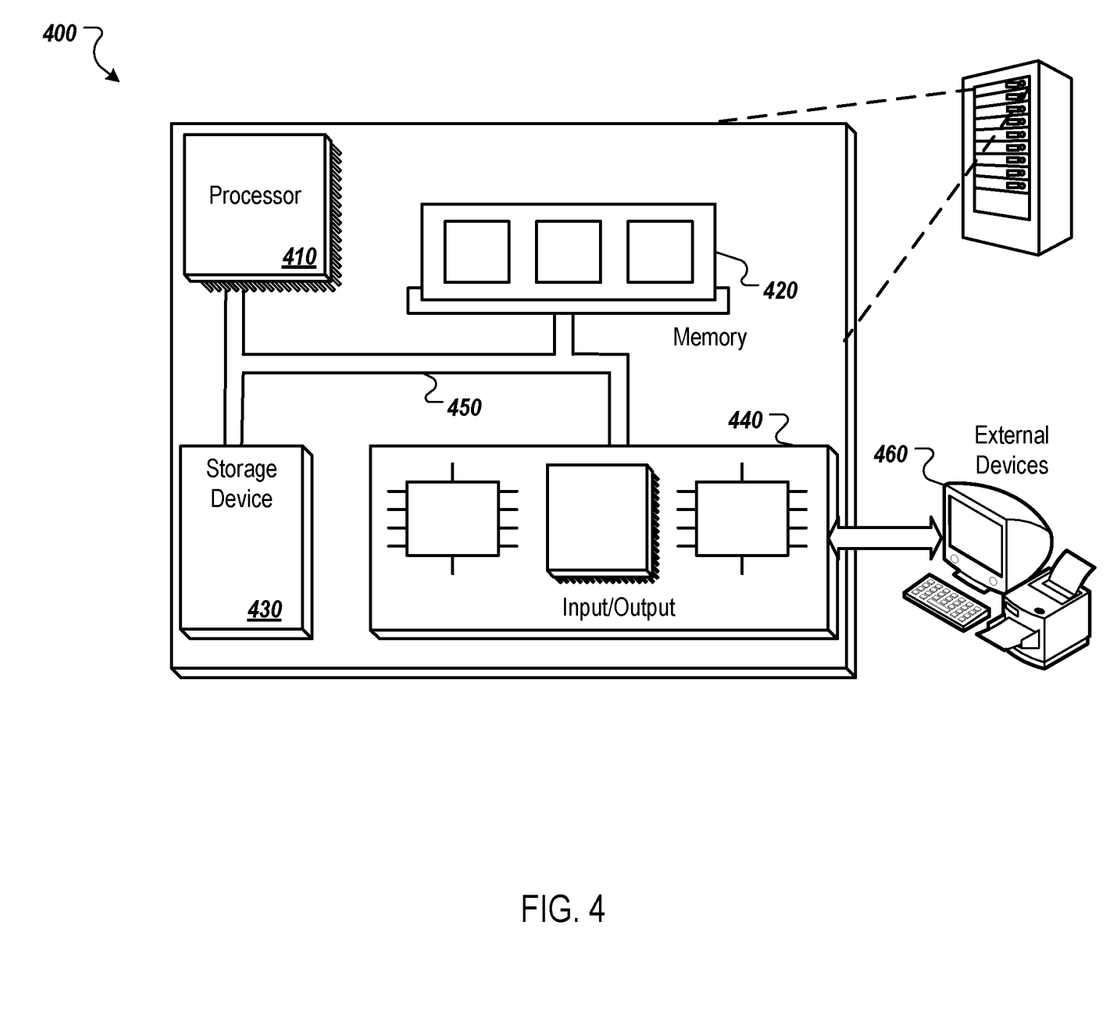
FIG. 4 is a block diagram of an example computer system.

FIG. 4 is a block diagram of an example computer system 400 that can be used to perform operations described above. The system 400 includes a processor 510, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 5440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 460, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   obtaining, for each of a plurality of user visits by a user to content pages of an electronic resource of a publisher, data indicating content categories of content of the content pages accessed by the user during the user visits;
   determining, for each content category, an aggregate measure based on a quantity of user visits by the user to content pages of the electronic resource of the publisher that included content classified as belonging to the content category;
   obtaining, for each of the plurality of user visits by the user to the content pages of the electronic resource of the publisher, user attribute prediction data indicating previously predicted user attributes of the user that were predicted based on activity of the user at the electronic resource of the publisher during the user visit;
   predicting, for a current visit of the user to the electronic resource of the publisher, user attributes of the user based on the aggregate measure for each content category and the obtained user attribute prediction data; and
   causing a digital component selected based on the predicted user attributes to be displayed with the electronic resource on a client device of the user during the current visit.

2. The computer-implemented method of claim 1, wherein obtaining data indicating content categories of the content of the content pages comprises evaluating digital content of the electronic resource displayed on the client device of the user and assigning the content to the content categories based on the evaluation.

3. The computer-implemented method of claim 1, wherein determining the aggregate measure for each content category comprises determining a weighted sum of the visits by the user to content pages of the electronic resource of the publisher that included content classified as belonging to the content category.

4. The computer-implemented method of claim 3, wherein determining the weighted sum of the user visits for a given content category comprises weighting each user visit based on a duration of time between a time at which the user visit occurred and a current time.

5. The computer-implemented method of claim 1, wherein determining the aggregate measure for each content category comprises:
   assigning, for each user visit by the user to a content page of the electronic resource of the publisher, a visit value based on whether the content page included content classified as belonging to the content category; and
   determining an average of the visit values for the content category.

6. The computer-implemented method of claim 1, wherein causing the digital component selected based on the predicted user attributes to be displayed with the electronic resource on a client device of the user during the current visit comprises:
   receiving a digital component request comprising the predicted user attributes and one or more contextual signals that indicate a context of one or more content pages of the electronic resources visited during the current user visit;
   selecting the digital component based on the predicted attributes and the one or more contextual signals; and
   sending the digital component to the client device of the user.

7. The computer-implemented method of claim 6, wherein predicting, for the current visit of the user to the electronic resource of the publisher, the user attributes of the user based on the aggregate measure for each content category and the obtained user attribute prediction data comprises:
   providing, as input to a context-based attribute prediction model trained to predict user attributes based on contextual signals, the aggregate measure for each content category, the user attribute prediction data for each user visit by the user to the content pages of the electronic resource of the publisher, and the one or more contextual signals; and
   receiving, as an output of the context-based attribute prediction model, the predicted user attributes of the user.

8. A system comprising:
   a memory device; and
   one or more processors configured to interact with the memory device and configured to perform operations, including:
   obtaining, for each of a plurality of user visits by a user to content pages of an electronic resource of a publisher, data indicating content categories of content of the content pages accessed by the user during the user visits;
   determining, for each content category, an aggregate measure based on a quantity of user visits by the user to content pages of the electronic resource of the publisher that included content classified as belonging to the content category;
   obtaining, for each of the plurality of user visits by the user to the content pages of the electronic resource of the publisher, user attribute prediction data indicating previously predicted user attributes of the user that were predicted based on activity of the user at the electronic resource of the publisher during the user visit;
   predicting, for a current visit of the user to the electronic resource of the publisher, user attributes of the user based on the aggregate measure for each content category and the obtained user attribute prediction data; and
   causing a digital component selected based on the predicted user attributes to be displayed with the electronic resource on a client device of the user during the current visit.

9. The system of claim 8, wherein obtaining data indicating content categories of the content of the content pages comprises evaluating digital content of the electronic resource displayed on the client device of the user and assigning the content to the content categories based on the evaluation.

10. The system of claim 8, wherein determining the aggregate measure for each content category comprises determining a weighted sum of the visits by the user to content pages of the electronic resource of the publisher that included content classified as belonging to the content category.

11. The system method of claim 10, wherein determining the weighted sum of the user visits for a given content category comprises weighting each user visit based on a duration of time between a time at which the user visit occurred and a current time.

12. The system of claim 8, wherein determining the aggregate measure for each content category comprises:
assigning, for each user visit by the user to a content page of the electronic resource of the publisher, a visit value based on whether the content page included content classified as belonging to the content category; and
determining an average of the visit values for the content category.

13. The system of claim 8, wherein causing the digital component selected based on the predicted user attributes to be displayed with the electronic resource on a client device of the user during the current visit comprises:
receiving a digital component request comprising the predicted user attributes and one or more contextual signals that indicate a context of one or more content pages of the electronic resources visited during the current user visit;
selecting the digital component based on the predicted attributes and the one or more contextual signals; and
sending the digital component to the client device of the user.

14. The computer-implemented method of claim 13, wherein predicting, for the current visit of the user to the electronic resource of the publisher, the user attributes of the user based on the aggregate measure for each content category and the obtained user attribute prediction data comprises:
providing, as input to a context-based attribute prediction model trained to predict user attributes based on contextual signals, the aggregate measure for each content category, the user attribute prediction data for each user visit by the user to the content pages of the electronic resource of the publisher, and the one or more contextual signals; and
receiving, as an output of the context-based attribute prediction model, the predicted user attributes of the user.

15. A computer readable medium storing instructions that, when executed by one or more data processing apparatus, cause the one or more data processing apparatus to perform operations comprising:
obtaining, for each of a plurality of user visits by a user to content pages of an electronic resource of a publisher, data indicating content categories of content of the content pages accessed by the user during the user visits;
determining, for each content category, an aggregate measure based on a quantity of user visits by the user to content pages of the electronic resource of the publisher that included content classified as belonging to the content category;
obtaining, for each of the plurality of user visits by the user to the content pages of the electronic resource of the publisher, user attribute prediction data indicating previously predicted user attributes of the user that were predicted based on activity of the user at the electronic resource of the publisher during the user visit;
predicting, for a current visit of the user to the electronic resource of the publisher, user attributes of the user based on the aggregate measure for each content category and the obtained user attribute prediction data; and
causing a digital component selected based on the predicted user attributes to be displayed with the electronic resource on a client device of the user during the current visit.

16. The computer readable medium of claim 15, wherein obtaining data indicating content categories of the content of the content pages comprises evaluating digital content of the electronic resource displayed on the client device of the user and assigning the content to the content categories based on the evaluation.

17. The computer readable medium of claim 15, wherein determining the aggregate measure for each content category comprises determining a weighted sum of the visits by the user to content pages of the electronic resource of the publisher that included content classified as belonging to the content category.

18. The computer readable medium of claim 17, wherein determining the weighted sum of the user visits for a given content category comprises weighting each user visit based on a duration of time between a time at which the user visit occurred and a current time.

19. The computer readable medium of claim 15, wherein determining the aggregate measure for each content category comprises:
assigning, for each user visit by the user to a content page of the electronic resource of the publisher, a visit value based on whether the content page included content classified as belonging to the content category; and
determining an average of the visit values for the content category.

20. The computer readable medium of claim 15, wherein causing the digital component selected based on the predicted user attributes to be displayed with the electronic resource on a client device of the user during the current visit comprises:
receiving a digital component request comprising the predicted user attributes and one or more contextual signals that indicate a context of one or more content pages of the electronic resources visited during the current user visit;
selecting the digital component based on the predicted attributes and the one or more contextual signals; and
sending the digital component to the client device of the user.

* * * * *

UNITED STATES PATENT AND TRADEMARK OFFICE
CERTIFICATE OF CORRECTION

| | | |
|---|---|---|
| PATENT NO. | : 12,130,875 B2 | Page 1 of 1 |
| APPLICATION NO. | : 18/008604 | |
| DATED | : October 29, 2024 | |
| INVENTOR(S) | : Huang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 136 days.

Signed and Sealed this
Eighth Day of April, 2025

Coke Morgan Stewart
*Acting Director of the United States Patent and Trademark Office*